Figure 1:
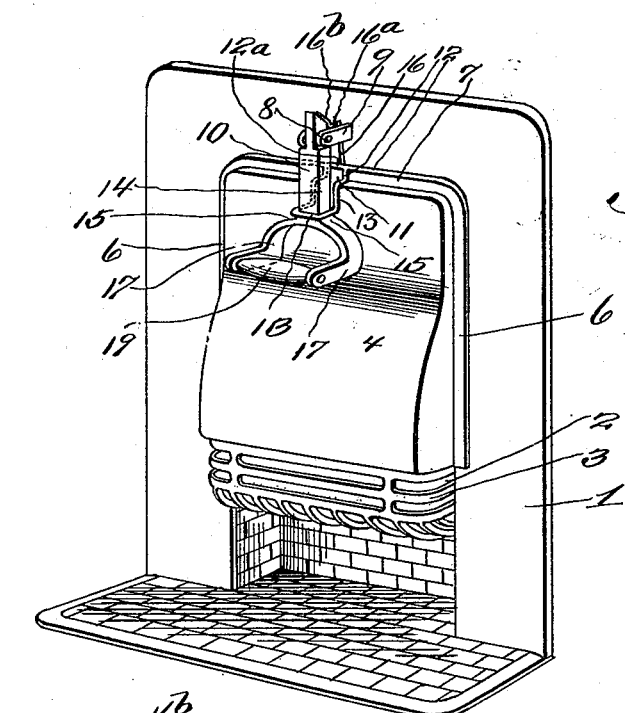

C. E. HITT.
BLOWER HOOD AND FASTENING THEREFOR.
APPLICATION FILED MAR. 4, 1915.

1,142,960. Patented June 15, 1915.

Witnesses
Inventor
C. E. Hitt,
By D. Swift & Co.,
his Attorneys

UNITED STATES PATENT OFFICE.

CHARLIE EDGAR HITT, OF LOOKOUT, WEST VIRGINIA.

BLOWER-HOOD AND FASTENING THEREFOR.

1,142,960.    Specification of Letters Patent.    Patented June 15, 1915.

Application filed March 4, 1915. Serial No. 12,209.

*To all whom it may concern:*

Be it known that I, CHARLIE EDGAR HITT, a citizen of the United States, residing at Lookout, in the county of Fayette and State of West Virginia, have invented a new and useful Blower-Hood and Fastening Therefor; and I do hereby declare the following to be a full, clear, and exact description of the invention, such as will enable others skilled in the art to which it appertains to make and use the same.

This invention relates to a new and useful blower hood for open fire grates, and a fastening device for the blower hood, and as an object of the invention it is the aim to provide an improved fastening of such construction as to hold the blower hood firmly in engagement with the frame surrounding the grate.

Another object of the invention is to provide a fastening device constructed in such wise that by raising the same by virtue of a handle, the blower hood is released from engagement with the grate, and slightly raised, and held in such position.

In practical fields the details of construction may necessitate alterations, falling within the scope of what is claimed.

The invention comprises further features and combination of parts, as hereinafter set forth, shown in the drawings and claimed.

Figure 2:
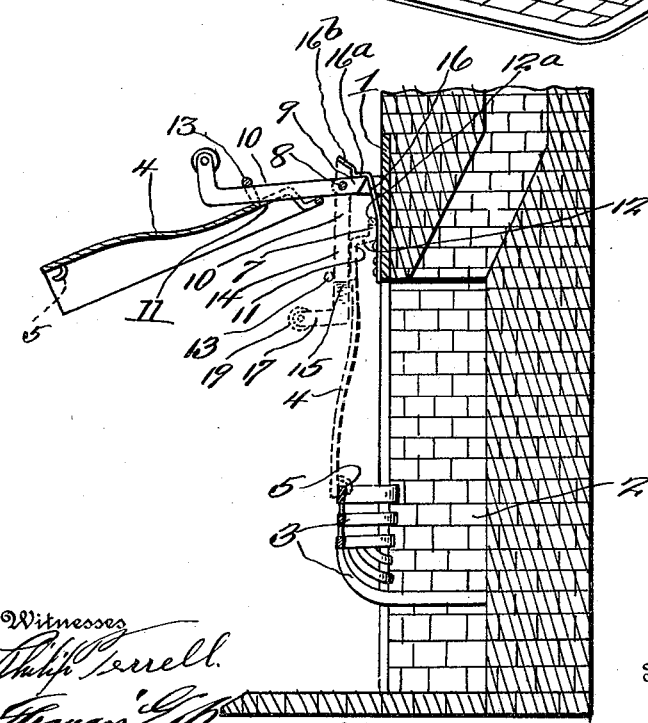

In the drawings:—Figure 1 is a view in perspective of an open fire grate, showing the improved fastening device applied to the blower hood, which is arranged in position to contact with the frame. Fig. 2 is a view showing the hood raised.

Referring more especially to the drawings, 1 designates the frame, which surrounds the open fire place 2, which is provided with the usual grate 3. The blower hood 4 is constructed of sheet metal, and is of a contour adjacent its lower portion corresponding with and fitting the contour of the grate, there being a suitable hook 5 at the lower portion to engage the top bar of the grate. The opposite side edges of the blower are provided with flanges 6 merging into a correspondingly constructed flange 7 at the top of the blower hood. Pivoted upon a pin 8 of the ears 9 of the frame 1 is a depending latch member 10. Adjacent the central portion of the blower hood near the top thereof is a U-shaped opening 11, the edge of which is bound by a wire 12 extending down from the flange 7, and conforming to the shape of the blower, and which wire extends outwardly forming a loop 13, through which the shank 14 of the latch extends. The loop 13 rests upon the shoulders 15 of the latch member, thereby supporting the blower hood in position, and by means of the spring device 16 with a shoulder 16$^a$, the latch is held closely in contact with the blower hood, to hold the hood in position. The lower portion of the latch member is constructed in the shape of a fork with arms 17, which are connected by the handle 19. It will be noted that by grasping the handle and swinging the same on its pivot, the blower hood may be thrown to the position shown in Fig. 2. However, prior to swinging the latch member 10 the hood is slightly raised, by applying pressure under the loop 13, until the part 12$^a$ contacts with the under edge of the ears 9, then the latch member 10 is swung upon its pivot. The spring device 16 assists in holding the blower hood in the position shown in Fig. 1, the end 16$^b$ contacting with the upper end of the latch member 10. However, when the latch member 10 is swung on its pivot, the upper end of the latch member moves into engagement with the shoulder 16$^a$, thereby holding the hood as shown in Fig. 2.

The invention having been set forth, what is claimed as new and useful is:—

1. The combination with a fire place, of a blower having an opening in its upper edge, and an outwardly projecting loop located adjacent to said opening, and a pivotally suspended latch member mounted above the opening of the fire place and coöperating with the loop to hold the blower in place.

2. The combination with a fire place frame of a blower having an opening in its upper edge and an outwardly projecting loop located adjacent to said opening, and a latch member pivotally suspended from the top of the fire place frame through said loop and opposite said opening and having a handle, and shoulders engaging said loop, and a spring on the fire place frame in yielding engagement with said latch to lock said latch and blower in elevated or lowered position.

In testimony whereof I have signed my name to this specification in the presence of two subscribing witnesses.

CHARLIE EDGAR HITT.

Witnesses:
HOMER E. NEFF,
ABEL TAYLOR.

Copies of this patent may be obtained for five cents each, by addressing the "Commissioner of Patents, Washington, D. C."